Patented June 11, 1935

2,004,383

UNITED STATES PATENT OFFICE 2,004,383

AZO-DYESTUFF AND FIBER DYED THEREWITH

Kurt Schimmelschmidt and Hans Thomae, Frankfort-on-the-Main, Germany, assignors to General Aniline Works, Inc., New York, N. Y., a corporation of Delaware No Drawing. Application August 7, 1934, Serial No. 738,882. In Germany August 12, 1933

2 Claims. (Cl. 260—95)

The present invention relates to an azo-dyestuff and to fiber dyed therewith; more particularly it relates to a dyestuff corresponding to the following formula:

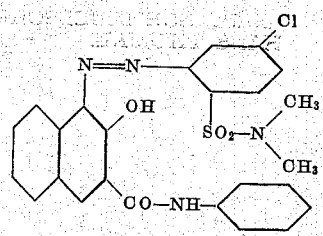

We have found that a valuable azo-dyestuff is obtainable by combining, in substance, on the fiber or on a substratum which is adapted for the production of lakes, the diazo-compound of 5-chloro-1-aminobenzene-2-sulfonic acid dimethylamide with 2,3-hydroxynaphthoic acid anilide. When the dyestuff is produced in the usual manner on the fiber, a golden-orange shade of a very good fastness to light is obtained.

This result is surprising, as, for instance, the dyestuff prepared from 2,3-hydroxy-naphthoic acid anilide and the diazo-compound of 2-chloro-1-aminobenzene-5-sulfonic acid dimethylamide, a compound which contains the sulfonic acid dimethylamide radical in m-position to the amino-group (German Patent 480,814), yields on the fiber scarlet-red dyeings the fastness to light of which is inferior to that of the dyestuff prepared from the diazo-compound of 5-chloro-1-aminobenzene-2-sulfonic acid dimethylamide. The displacement of the shade to the yellow side of the spectrum and the increase of the fastness to light by exchanging the substituents of the diazo-component, could in no way be foreseen.

The azo-dyestuff obtainable according to the present process may also very well be produced on the fiber in the printing process by using the diazo-compound in the form of the stable zinc-chloride double-salt and printing it on the material grounded with the coupling component. Without a long after-treatment by soaping at boiling temperature there is immediately obtained the desired golden-orange tint which could not be obtained, hitherto, with the 2,3-hydroxynaphthoic acid anilide used almost exclusively in printing processes and with the commercial diazo-components. The azo-dyestuff, obtainable according to the present process, represents, therefore, a valuable technical enrichment.

The following examples serve to illustrate the invention, but they are not intended to limit it thereto, the parts being by weight, unless otherwise stated:

(1) 50 grams of boiled cotton yarn are treated in 1 liter of the grounding liquor for half an hour, freed from water by wringing or centrifuging and developed in the moist state, in the dye bath. The dyed yarn is rinsed, soaped at boiling temperature and dried.

(a) Grounding liquor 6 grams of 2,3-hydroxynaphthoic acid anilide are dissolved in
12 cc. of alcohol.
3 cc. of caustic soda solution of 34° Bé.,
3 cc. of formaldehyde solution of 30 per cent. strength and
6 cc. of water and made up with
10 cc. of Turkey red oil of 50 per cent. strength,
7 cc. of caustic soda solution of 34° Bé. and water to ———
1 liter.

(b) Dye bath 2.3 grams of 5-chloro-1-aminobenzene-2-sulfonic acid dimethylamide are dissolved in
10 cc. of acetone;
3.1 cc. of hydrochloric acid of 20° Bé. are added and, after addition of
10 grams of ice, the whole is diazotized with
8 cc. of a solution of sodium nitrite 1:10.

The diazo-solution is neutralized with sodium acetate and, after addition of common salt and water, made up to 1 liter.

A vivid golden-orange shade of good fastness properties, especially of a very good fastness to light and to ironing, is obtained.

(2) A solution of the diazo-compound prepared in the usual manner from 23.5 parts of 5-chloro-1-aminobenzene-2-sulfonic acid dimethylamide is allowed to run into an aqueous suspension of 26.3 parts of 2,3-hydroxynaphthoic acid anilide prepared by dissolving the anilide in an alcoholic caustic soda solution, diluting with water and neutralizing with acetic acid. After termination of the coupling reaction, the dyestuff is filtered by suction, washed until neutral and dried; it forms an orange-colored powder.

(3) Printing prescription

The material to be printed is grounded on the foulard, printed, dried, passed through a hot sodium carbonate bath (2 grams per liter), rinsed, soaped at boiling temperature and rinsed again.

(a) Grounding liquor 15 grams of 2,3-hydroxynaphthoic acid anilide are dissolved in
20 cc. of Turkey red oil and
18 cc. of caustic soda solution of 38° Bé. and made up with water to 1 liter.

(b) Printing color 6.5 grams of a dyeing salt containing the zinc-chloride double-salt of the diazonium-chloride from 5-chloro-1-aminobenzene-2-sulfonic acid dimethylamide, diluted with anhydrous sodium sulfate (=1.3 grams of the base) are dissolved in
5 cc. of acetic acid of 50 per cent. strength and
48.5 cc. of water.
40 cc. of wheat starch-tragacanth-thickening are then added.

100 grams of printing color.

A vivid golden-orange tint of very good fastness properties is obtained as in Example 1.

By using for the preparation of the printing color, instead of acetic acid, 10 cc. of an aqueous solution of aluminium-sulfate (1:1), the printing color may be used as resist under dyeings with diazo-compounds from aminodiphenylamine-derivatives.

We claim:
1. The azo-dyestuff of the following formula:

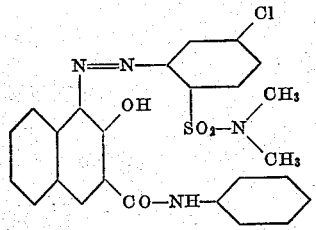

yielding, when produced on the fiber, a vivid golden-orange shade of good fastness properties, particularly of very good fastness to ironing and to light.

2. Fiber dyed with the azo-dyestuff as claimed in claim 1.

KURT SCHIMMELSCHMIDT.
HANS THOMAE.